United States Patent [19]

Lohmiller

[11] 4,292,808
[45] Oct. 6, 1981

[54] ENERGY CONVERTER

[76] Inventor: Edward W. Lohmiller, 2445 S. 13th Ave., Broadview, Ill. 60153

[21] Appl. No.: 26,007

[22] Filed: Apr. 2, 1979

[51] Int. Cl.³ .............................................. F01K 25/06
[52] U.S. Cl. ........................................ 60/673; 60/649
[58] Field of Search ................................. 60/649, 673

[56] References Cited

U.S. PATENT DOCUMENTS

| | | | |
|---|---|---|---|
| 427,399 | 5/1890 | Campbell | 60/649 |
| 3,505,810 | 4/1970 | Mamiya | 60/649 X |

Primary Examiner—Allen M. Ostrager
Assistant Examiner—Stephen F. Husar
Attorney, Agent, or Firm—Andrew J. Bootz

[57] ABSTRACT

There is provided an improved energy converting system for converting low temperature heat energy into mechanical energy. The energy converting system includes an absorption system including a carrier fluid and a working medium absorbable by the carrier fluid. Evaporator means receives the low thermal energy and converts the working medium from a liquid to a gas. The gaseous working medium is then absorbed by the carrier fluid, and the concentrated mixture of working medium and carrier fluid goes into a separator wherein the medium and fluid are separated by compression. A condenser means is provided for removing heat from the gaseous working medium and thereby converting the gaseous working medium into a liquid. Energy converting means are provided associated with one of the above means for converting the energy in the system into other forms of energy, such as into mechanical energy.

4 Claims, 5 Drawing Figures

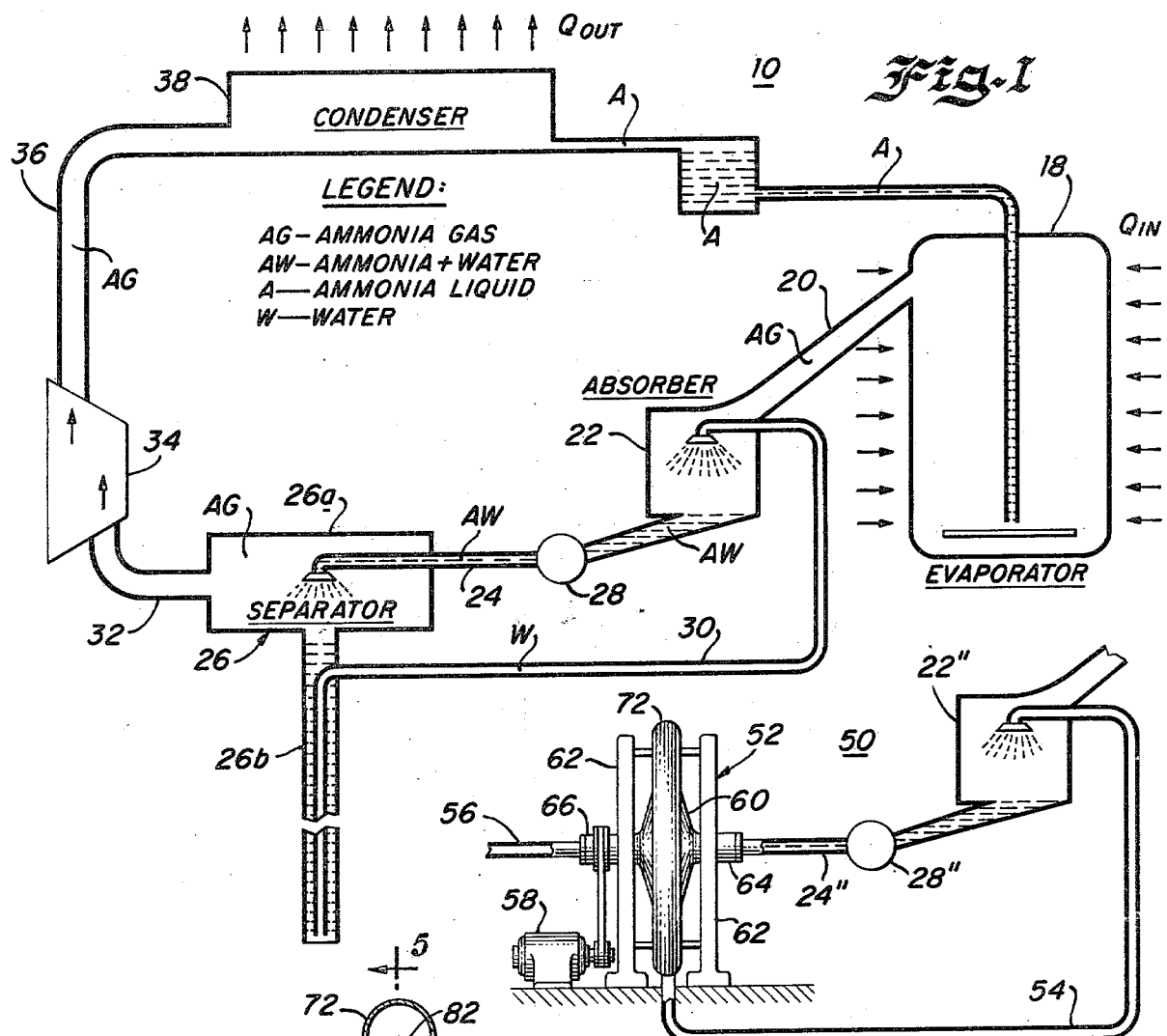
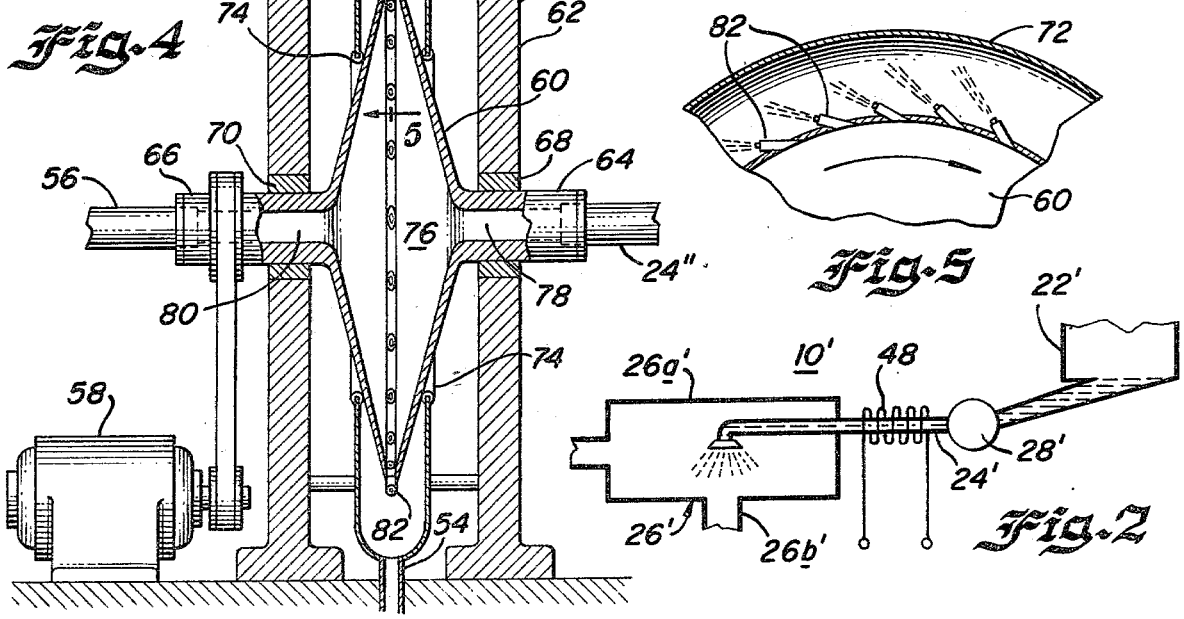

ENERGY CONVERTER

BACKGROUND AND PRIOR ART

With the increasing scarcity of conventional energy sources such as coal, oil, and gas, it becomes increasingly desirable to convert energy from commonly available sources into useful forms of energy, such as mechanical energy. Low temperature energy sources, such as solar energy or ambient energy is available in unlimited quantities; however there has been some difficulty heretofore in practically converting such low temperature sources into useful work.

Accordingly it is an object of this invention to convert energy from relatively low thermal sources into useful work.

Another object of the invention is to concentrate low thermal energy of a system into a manner permitting the utilization thereof as useful work.

Another object of the invention is to provide a system in which ambient thermal energy is absorbed by a carrier fluid and conducted to a chamber in which the energy is concentrated and pressures are increased to a degree sufficient for useful utilization.

SUMMARY OF THE INVENTION

There is provided an improved energy converting system for converting low temperature heat energy into mechanical energy. The energy converting system includes a liquid carrier fluid, such as water, and a compressible working medium, such as ammonia, absorbable by the carrier fluid and convertible between the liquid and gaseous states. Evaporator means receives the low thermal energy and transmits the heat energy from the low thermal source to the working medium to convert the working medium from a liquid to a gas. The gaseous working medium is then absorbed by the carrier fluid, and the concentrated mixture of carrier fluid and working medium passes into a separator wherein the fluid and medium are separated by compression. A condenser means is provided for converting the gaseous working medium into a liquid. Energy converting means are associated with one of the above means for converting the energy in the system into mechanical energy.

In accordance with one embodiment of the invention, the separator means consists of a deepwell or standpipe wherein the fluid pressure at the bottom of the well or standpipe is sufficiently great to separate the gaseous working medium from the liquid carrier fluid. Mechanical energy, such as a turbo-electric generator, may be imposed in the system for converting the system into useful work.

In accordance with another embodiment of the invention, the separator means comprises a centrifugal separator, which may consist of a turbine type device propelled by the outwardly slung liquid carrier fluid. The centrifugal pressure created in the concentrated mixture of working medium and carrier fluid will separate the gaseous working medium from the carrier fluid. The output of the turbine type separator may be used to produce other work, such as drive an electrical generator.

DESCRIPTION OF THE DRAWINGS

FIG. 1 is a schematic diagram of an Energy Converting System according to the present invention;

FIG. 2 is a fragmentary schematic diagram of a modification of the energy converting system of FIG. 1;

FIG. 3 is a fragmentary schematic diagram of yet another modification of the energy converting system of FIG. 1;

FIG. 4 is a fragmentary sectional view of the separator of the energy converting system of FIG. 3; and FIG. 5 is a fragmentary sectional view of the separator of FIG. 4, taken along line 5—5 of FIG. 4.

DETAILED DESCRIPTION OF THE EMBODIMENT OF FIG. 1

Referring now to the embodiment of FIG. 1, there is illustrated an improved energy converting system 10 for converting energy from a relatively low thermal source, such as solar energy, into mechanical or electromechanical energy.

The energy converting system 10 includes a carrier fluid 12, herein comprising water, and a compressible working medium 14, absorbable in the carrier fluid, herein comprising ammonia. The ammonia is readily convertible between the gaseous and liquid states. In the schematic illustration of FIG. 1, hot ammonia gas is represented by the symbol AG; hot ammonia gas absorbed in water to provide a concentrated mixture of ammonia and water is represented by the symbol AW; cool liquid ammonia is represented by the symbol A; and cool, ammonia free water is represented by the symbol W.

In the illustrated embodiment, there is provided an evaporator or evaporator means 18 for receiving a low thermal source energy $Q_{in}$, such as solar energy, to evaporate the ammonia from a liquid state to a gaseous state. The gaseous ammonia passes from the evaporator 18 through a conduit 20 into an absorber or absorption means 22. In the absorber 22 the gaseous ammonia comes in contact with the water, and in the illustrated embodiment, the water is sprayed into the chamber of gaseous ammonia so that the water absorbs the ammonia to provide the concentrated mixture of ammonia in water.

The concentrated mixture of ammonia and water passes through a conduit 24 into a separator or separator means, and may utilize a pump 28 in the conduit 24 for effecting the transfer. The separator 26 is here shown as including a spray chamber 26a and a deep well or standpipe 26b, which may have sufficient depth to establish the required pressure in the separator. The pressure in the separator 26 separates the ammonia from the concentrated mixture, and the ammonia rises through the deepwell or standpipe, while the ammonia free water settles to the bottom of the deepwell or standpipe 26a, and is returned to the absorber 22 through a conduit 30.

The hot ammonia gas is discharged from the separator 26 through a conduit 32 into an energy converter, here shown as a turbine 34 where the energy contained in the hot ammonia gas is converted into mechanical energy.

The low pressure gas is discharged from the turbine 34 through a conduit 36 into a condenser 38, where heat energy $Q_{out}$ is removed. The warmer, low pressure exhaust gas in the condenser 38 is cooled and condensed into a liquid and the liquid ammonia passes into a receiver 40, through another conduit 42, and returned to the evaporator 18.

From the above detailed description, the operation of the energy converting system 10 is believed clear. However, briefly, low thermal energy, such as solar or ambient energy, is transmitted to the working fluid in an evaporator. The evaporation of the ammonia in the evaporator maintains the temperature of the ammonia sufficiently low to receive the transfer of heat from the low energy heat source. The gaseous ammonia, with the added heat of the energy source, passes from the evaporator into an absorber, where it is absorbed into the water, transmitted to the separator, and removed from the concentrated mixture, containing the added heat. The high energy ammonia gas then passes into an energy converter, such as the turbine 34, where energy (or heat) is utilized from the gaseous ammonia, to discharge a low pressure, low temperature gas. The condenser 38, which removes excess heat from the ammonia, condenses the ammonia, and creates a vacuum condition at the discharge side of the turbine 34. The cool, condensed ammonia, having a low thermal content, is then transferred back to the evaporator, where thermal energy is added to continue the energy conversion cycle.

DETAILED DESCRIPTION OF THE EMBODIMENT OF FIG. 2

Ammonia gas with a higher energy content may be provided to the energy converting means of the system of FIG. 1 by adding heat to the concentrated mixture of ammonia in water at any suitable point in the system. Referring now to FIG. 2, there is fragmentarily illustrated a portion of the energy conversion system of FIG. 1, here referred to as 10', including the absorber 20', from where a concentrated mixture of ammonia and water are transferred to the separator 26' through the conduit 24' by means of the pump 28'. Heat energy is added to the ammonia and water mixture downstream of the pump 28' in any suitable manner, as by conventional fossil fuel.

DETAILED DESCRIPTION OF THE EMBODIMENTS OF FIGS. 3 through 5

There is illustrated in FIGS. 3 through 5 an embodiment of the invention wherein the separator and energy converter are combined into a turbine-type centrifugal device. More specifically, referring to FIG. 3, there is fragmentarily illustrated an energy converting system 50, similar to the energy converting system 10 of FIG. 1, but having a modified separator and energy converter 52. The ammonia gas from the evaporator passes into the absorber 22" wherein it is mixed with water entering the absorber 22" from the water return conduit 54, and the concentrated mixture of ammonia and water passes from the absorber 22" through conduit 24" into the separator-energy converter 52. The pump 28" in the conduit 24" helps to propell the ammonia-water mixture into the separator-energy converter 52. The ammonia fluid is discharged from the separator-energy converter 52 through a conduit 56 into a condenser. The separator-energy converter 52 may drive any desired energy converter, such as the generator 58.

The separator-energy converter 52, best illustrated in FIGS. 4 and 5, includes a rotor 60 supported in a stationary frame 62 on hollow journals 64, 66 in journal bearings 68, 70 on the frame. A stationary collector or collector ring 72 extends around the periphery of the rotor. Suitable sealing means 74 provides a fluid tight seal between the rotor 60 and the collector 72. The rotor 60 has a hollow interior 76 communicating with an inlet opening 78 in the hollow journal 64; and an outlet opening 80 extends through the hollow journal 66. The rotor 60 has a plurality of generally tangentially extending jet nozzles or ports 82 defining jet means for propelling the rotor 60.

In operation, the concentrated mixture of ammonia and water enters the hollow interior 76 of the rotor 60 through the inlet opening 78, and the centrifugal action of the rotor 60 throws the concentrated mixture outwardly, as illustrated, highly compressing the concentrated mixture. The ammonia gas is driven out of the concentrated ammonia-water mixture by the high pressure, and is discharged through the outlet opening 80 in the journal 66. The heavier water is thrown outwardly, and is forced through the nozzles 82, driving the rotor 60. The water is collected in the bottom of the collector 72, and is discharged through the water conduit 54 back to the absorber 22".

What is claimed as new, and desired to be secured by Letters Patent of the United States is:

1. An energy converting system for converting energy from a relatively low thermal source into useful energy comprising:
   a carrier fluid;
   a compressible working medium absorbable by said carrier fluid and convertible between the liquid and gaseous states;
   evaporator means receiving heat energy from a relatively low thermal source for transferring the working medium from the liquid to the gaseous states;
   absorption means connected to receive the gaseous working medium from said evaporator and to receive said carrier fluid for absorbing the gaseous working medium into said carrier fluid to provide a concentrated fluid-medium mixture;
   separator means receiving the concentrated fluid-medium mixture separating the working medium from said concentrated fluid-medium by compressing the concentrated fluid-medium mixture;
   conduit means returning said carrier fluid from the separator to said absorption means;
   condenser means discharging heat energy connected to receive the working medium from said separator means for converting the gaseous working medium to a liquid state;
   conduit means connecting said condenser means to said evaporator means;
   energy converting means operatively connected with said separator means between the said absorption means and the said condenser means for converting energy from said working medium to another form of energy.

2. An energy converting system as set forth in claim 1 above wherein said carrier fluid is water, and said working medium is ammonia.

3. An energy converting system as set forth in claim 1 wherein said separator comprises a standpipe means for developing a pressure on said working medium-carrier fluid mixture.

4. An energy converting system as set forth in claim 1 above wherein there is provided a combined separator means and energy converting means comprising a turbine type centrifugal rotor receiving said concentrated fluid-medium mixture and centrifugally separating said fluid and medium.

* * * * *